United States Patent
Piggin et al.

(10) Patent No.: US 10,301,042 B2
(45) Date of Patent: May 28, 2019

(54) PITOT-STATIC AIR DATA TEST SYSTEM WITH AUTOMATIC DEPENDENT SURVEILLANCE-BROADCAST (ADS-B) VERIFICATION

(71) Applicant: General Electric Company, Schenectady, NY (US)

(72) Inventors: Thomas J. Piggin, Leicester (GB); Neil Stewart Sands, Leicestershire (GB); Peter John McCarthy, Shropshire (GB)

(73) Assignee: General Electric Company, Schenectady, NY (US)

( * ) Notice: Subject to any disclaimer, the term of this patent is extended or adjusted under 35 U.S.C. 154(b) by 81 days.

(21) Appl. No.: 15/484,948

(22) Filed: Apr. 11, 2017

(65) Prior Publication Data

US 2018/0290766 A1  Oct. 11, 2018

(51) Int. Cl.
*B64F 5/60* (2017.01)
*G01P 21/00* (2006.01)
(Continued)

(52) U.S. Cl.
CPC .............. *B64F 5/60* (2017.01); *G01P 5/16* (2013.01); *G01P 21/00* (2013.01); *G01P 21/025* (2013.01);
(Continued)

(58) Field of Classification Search
CPC .... B64F 5/60; G01P 5/16; G01P 21/00; G01P 21/025; G01S 19/14; G01S 19/03;
(Continued)

(56) References Cited

U.S. PATENT DOCUMENTS 4,184,205 A * 1/1980 Morrow .................. G07C 3/00
340/683
4,626,996 A * 12/1986 Arlott .................. H04L 12/403
701/14
(Continued)

FOREIGN PATENT DOCUMENTS

DE        692 07 352 T2     8/1996

OTHER PUBLICATIONS

Neues Design des IPK09 : Winter Instruments Bordgerate, Gebr. Winter Gmbh & Co. Kg, Retrieved from the Internet URL: https://www.winter-instruments.de/single-post/2016/04/26/Neues-Design-des-IPK09, on Oct. 15, 2018, pp. 1-2 (Apr. 2016).
(Continued)

*Primary Examiner* — Mussa A Shaawat
(74) *Attorney, Agent, or Firm* — Mintz Levin Cohn Ferris Glovsky and Popeo, P.C.

(57) ABSTRACT

A system for verifying an aircraft instrumentation value comprising: an Air Data Test Module (ADTM) configured to pneumatically simulate at least one instrumentation value based upon a pressure set-point. The pneumatically simulated instrumentation value corresponds to the pressure set point and is reported by an aircraft transponder. A receiver module receives the pneumatically simulated instrumentation value transmitted by the aircraft transponder. A signal processor, is operative to (i) control the ADTM, (ii) command a prescribed instrumentation value to be simulated by the ADTM, (iii) compare the prescribed instrumentation value to the pneumatically simulated instrumentation value, and (iv) issue a pass signal when the values match, and a fail signal when the values differ by a threshold value.

27 Claims, 8 Drawing Sheets (51) Int. Cl.
   *G01P 5/16* (2006.01)
   *G01S 19/03* (2010.01)
   *G01S 19/14* (2010.01)
   *G07C 5/08* (2006.01)
   *G01P 21/02* (2006.01)
   *G08G 5/00* (2006.01)
   *H04W 84/00* (2009.01)

(52) U.S. Cl.
   CPC .............. *G01S 19/03* (2013.01); *G01S 19/14* (2013.01); *G07C 5/0825* (2013.01); *G08G 5/0013* (2013.01); *G08G 5/0021* (2013.01); *H04W 84/00* (2013.01); *G08G 5/0052* (2013.01)

(58) Field of Classification Search
   CPC ... H04W 84/00; G08G 5/0013; G08G 5/0021; G08G 5/0052
   See application file for complete search history.

(56) References Cited

U.S. PATENT DOCUMENTS

| | | | |
|---|---|---|---|
| 5,023,791 A | 6/1991 | Herzberg et al. | |
| 5,260,874 A * | 11/1993 | Berner | G09B 9/24 434/242 |
| 5,579,244 A | 11/1996 | Brown | |
| 6,622,972 B2 * | 9/2003 | Urnes, Sr. | G05D 1/0055 244/194 |
| 6,915,189 B2 * | 7/2005 | Igloi | B64F 5/60 701/14 |
| 2010/0211237 A1 * | 8/2010 | Nichols | G01C 23/00 701/14 |
| 2011/0057830 A1 * | 3/2011 | Sampigethaya | G01S 5/0072 342/36 |
| 2018/0198516 A1 * | 7/2018 | Garcia | H04B 7/18506 |

OTHER PUBLICATIONS

Welcome to the wireless ADTS5000 Series, GE Measurement & Control, Retrieved from the Internet URL: https://www.gemeasurement.com/sites/gemc.dev/files/adts500 brochure.pdf, on Oct. 15, 2018, pp. 1-2 (Jan. 2016).

Winter Instruments Bordgerate, Gebr. Winter Gmbh & Co. Kg, Retrieved from the Internet URL: https://www.winter-instruments_de/prfkoffer—mobile-test-kit, on Oct. 15, 2018, pp. 1-3 (Jan. 2016).

Extended European Search Report and Opinion issued in connection with corresponding EP Application No. 18165390.8 dated Jul. 16, 2018.

* cited by examiner

PITOT-STATIC AIR DATA TEST SYSTEM WITH AUTOMATIC DEPENDENT SURVEILLANCE-BROADCAST (ADS-B) VERIFICATION

BACKGROUND

In many instances, one of the most critical systems for aircraft can be the pitot-static system operative to determine the airspeed and/or altitude of the aircraft inflight. Aircraft having dual controls can include separate, yet integrated, pilot and co-pilot systems. Many aircraft may employ a pitot tube having a combination of at least one forward-facing aperture and a plurality of orthogonal apertures, disposed about the circumference of the tube. In-flight, the total or impact pressure ($P_i$) of the airstream can be captured by the forward-facing aperture (i.e., the pitot port) as the airstream rams and stagnates, i.e., decelerates to essentially zero (0) kts. When disposed in a region of relatively undisturbed flow, the orthogonal apertures can measure static pressure ($P_s$) which is a direct measurement of the free stream airflow from which altitude and rate of climb may be derived. By using the values of static pressure ($P_s$) and impact or total pressure ($P_i$), the aircraft instrumentation system can derive measurements for airspeed and Mach number.

A related system, which may be equally flight critical, is the Automatic Dependent Surveillance-Broadcast (ADS-B) system. This system may use a radio transmitter or radar transponder to broadcast aircraft position and flight plan information to other aircraft flying in the same regional airspace. More specifically, the ADS-B can transmit information concerning altitude ($A_{SL}$), airspeed (A/S), and location data to area ground stations, and to other ADS-B-equipped aircraft in the vicinity. While air traffic controllers use the information for traffic management, i.e., keeping aircraft some threshold vertical and/or lateral distance from each other, the ADS-B is particularly valuable over large bodies of water, e.g., the Atlantic or Pacific oceans, where aircraft are often out of the range of control towers/air traffic control. Accordingly, the pilots of each aircraft are individually responsible for maintaining a safe distance between their aircraft and others passing in close proximity. As such, a pilot is trained to listen for broadcast information and make flight plan adjustments, e.g., increase or decrease altitude, change heading, etc., to maintain a safe separation distance between the operated aircraft and an approaching aircraft.

Presently, many aircraft operators perform routine maintenance/testing of both the pitot-static and transponder systems after a threshold number of flight hours, or after an alert has been issued by the on-board aircraft diagnostic system. Generally, each system requires dedicated hardware, firmware and/or software to run a series of tests corresponding to predefined in-flight conditions. That is, the pitot-static air data system employs an Air Data Test Set which connects to the pitot and static ports of an aircraft via a number of hoses and fittings, while the ADS-B system is tested for operation of the transponder and the issuance/broadcast of the correct longitude, latitude, airspeed and altitude data relative to sea level (i.e., while the aircraft is on the ground).

In addition to the cost of owning and operating separate test systems, i.e., an Air Data Test System (ADTS) and an Automatic Dependent Surveillance-Broadcast (ADS-B) test set, each system offers its own unique challenges of operation, i.e., errors during test. With respect to the ADTS, even small pneumatic air leaks in the system can produce significant/sizeable variations in altimeter readings. For example, an error/variation as small as 0.1 millibars in air pressure will result in a variation of eighty (80 feet) of vertical height.

SUMMARY OF THE DISCLOSURE

In one embodiment of the disclosure, an Air Data Test System (ADTS) is provided for testing an aircraft pitot-static system including at least one pneumatic pump configured to generate at least one air pressure value, at least two pairs of impact and static ADTS ports, a manifold system in fluid communication with the pneumatic pump and each pair of impact and static ADTS ports, and a signal processor operatively coupled to, and controlling, the pneumatic pump and the manifold system. The ADTS signal processor is configured to issue control signals thereto for independently and collectively testing each of the pilot and co-pilot pitot-static systems concurrently or in turn. One pair of ADTS ports is configured to supply air pressure to the pilot pitot-static system and the other pair of ADTS ports is configured to supply air pressure to the co-pilot pitot-static system.

In another embodiment, a mobile device having graphical user interface wirelessly communicates with the signal processor. The mobile device is operative to input the pressure values requisite for testing the pilot and co-pilot pitot-static systems.

In another embodiment, a system is provided for verifying an aircraft instrumentation value comprising an Air Data Test Module (ADTM) configured to pneumatically simulate at least one instrumentation value based upon a pressure set-point. The pneumatically simulated instrumentation value corresponds to the pressure set point and is reported by an aircraft transponder. A receiver module receives the pneumatically simulated instrumentation value which is transmitted by the aircraft transponder. A signal processor is operative to (i) control the ADTM, (ii) command a prescribed instrumentation value to be simulated by the ADTM, (iii) compare the prescribed instrumentation value to the pneumatically simulated instrumentation value, and (iv) issue a pass signal when the values match, and a fail signal when the values differ by a threshold value.

In another embodiment, a method is provided for testing a Pitot-Static Air Data system and an Automatic Dependent Surveillance-Broadcast (ADS-B) system. The method includes the steps of: (i) determining a prescribed instrumentation value, (ii) calculating a pressure set point indicative thereof; (iii) pneumatically pressurizing the aircraft pitot-static systems by an Air Data Test Module (ADTM) to simulate at least one instrumentation value, (iv) receiving the simulated instrumentation value issued by the cockpit instrumentation from an aircraft transponder, (v) comparing the simulated instrumentation value to the prescribed value, (vi) determining whether the simulated and prescribed instrumentation values are equal, and (vii) providing a visual cue to an operator to validate the operation of the Pitot-Static Air Data system and ADS-B systems.

The above embodiments are exemplary only. Other embodiments are within the scope of the disclosed subject matter.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are, therefore, not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Differences between otherwise like parts may cause to those parts to be indicated with different numerals. Differences parts are indicated with different numerals. Thus, for further understanding of the invention, reference can be made to the following detailed description, read in connection with the drawings in which.

DETAILED DESCRIPTION

Embodiments of the disclosed subject matter provide a Pitot-Static Air Data Test System (ADTS) for simulating in-flight conditions of the pilot and co-pilot pitot-static systems configured to simultaneously operate/energize the pilot/co-pilot pitot-static air data systems of a single or dual-piloted aircraft. In another embodiment, the disclosed subject matter provides a Pitot Static Tester which employs the capabilities of an Automated Dependent Surveillance-Broadcast System (ADS-B) which can validate data and information broadcast by a transponder, such as an aircraft transponder, which may enhance the functionality of the Pitot-Static Tester. Other embodiments are within the scope of the disclosed subject matter.

The embodiments disclosed herein may provide an Air Data Test System (ADTS) and an Automatic Dependent Surveillance-Broadcast (ADS-B) System which provide simultaneous testing of the Pilot and Co-Pilot pitot-static air data systems while additionally incorporating test procedures associated with its flight critical air data systems, e.g., the aircraft GPS, transponder, etc.

Pitot-Static Air Data Test System with Pilot and Co-Pilot Verification

Figure 1:
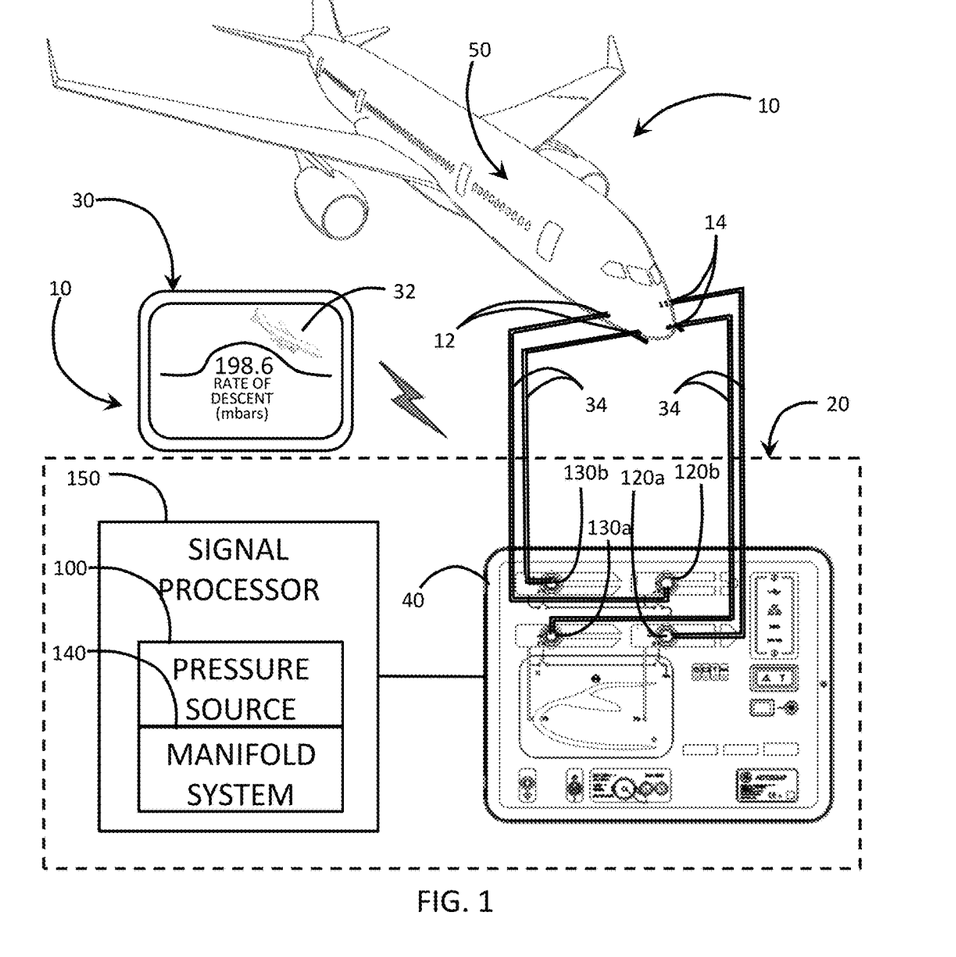
FIG. 1 is a broken-away, schematic view of an Air Data Test System (ADTS) according to the present invention including a perspective view of a commercial aircraft, an Air Data Test Set (ADTS), or an Air Data Test Module (ADTM), a pressure source, a manifold system, and a Graphical User Interface (GUI) wirelessly connected to, and controlling, the ADTS while conducting an aircraft air data test.

In FIG. 1, an Air Data Test System (ADTS) 10 can include an air data test set 20 and can include a mobile device 30, which may be wirelessly connected to the air data test set 20. The air data test set 20 can include a housing 40 for enclosing, encasing or integrating: (i) at least one pressure source 100, (ii) first and second static ports 120a, 120b in fluid communication with the pressure source 100, (iii) first and second impact ports 130a, 130b (hereinafter "pitot" ports) also in fluid communication with the pressure source 100, (iv) a manifold system 140 interposing, and pneumatically coupled to, the pressure source 100 and each of the static and pitot ports 120a, 120b, 130a, 130b, and (v) at least one signal processor 150 operatively coupled to, and controlling the operation of the pressure source 100 and the manifold system 140. The first and second static ports 120a, 120b correspond to first and second channels, CS1 and CS2, respectively, while the first and second impact ports 130a, 130b correspond to third and fourth channels, CP1 and CP2, respectively. The function of the various elements 30, 100, 120a, 120b, 130a, 130b, 140, 150 and the various channels CS1, CS2, CP1, CP2, are discussed in greater detail below.

The mobile device 30 can include a graphical user interface 32 for inputting commands to the ADTS 10. The mobile device 30 may include one or more of a variety of mobile devices, for example, an IPhone® Series of Apple® products (both "iPhone" and "Apple" are registered Trademarks of Apple Inc., located in the city of Cupertino, Calif., USA) which can be Bluetooth-enabled to allow wireless pairing of the ADTS 20 to the mobile device 30. The mobile device 30 may enable an operator to input a static and impact (pitot) instrumentation value corresponding to an altitude and/or airspeed that the operator seeks to test. As will be discussed in greater detail below, the static and impact pressure values may be simultaneously input to each of a first and a second system (i.e. the pilot and co-pilot systems). While the disclosure describes a mobile device having a Graphical User Interface (GUI) for inputting test data the Air Data Test System (ADTS) 20 may include an input device which is wired directly to, or within, the test unit. For example, a touch screen input device (not shown) may be integrated into the face of the Air Data Test System (ADTS) housing 40. In other embodiments, a computer terminal having a conventional monitor may be directly connected to the ADTS 20.

Table I below depicts a typical sequence of test values or "break points" input by an operator for the purpose of testing the operability and accuracy of the Aircraft Data Test System. Therein, seven (7) pairs of commanded pressure values, i.e., static and pitot values, can be input via the mobile device 30.

TABLE I

| Test Point | Altitude (feet) | Ps Pressure (mbar Abs.) | Airspeed (Knots) | Pt Pressure (mber Abs.) | Qc Diff. Press. (mbar) |
|---|---|---|---|---|---|
| 1 | 0 | 1013.25 | 90.0 | 1026.44 | 13.19 |
| 2 | 5,000 | 843.07 | 130.0 | 870.73 | 27.66 |
| 3 | 15,000 | 571.82 | 250.0 | 676.80 | 104.98 |

TABLE I-continued

| Test Point | Altitude (feet) | Ps Pressure (mbar Abs.) | Airspeed (Knots) | Pt Pressure (mber Abs.) | Qc Diff. Press. (mbar) |
|---|---|---|---|---|---|
| 4 | *29,000 | 314.85 | 310.0 | 479.37 | 164.52 |
| 5 | 35,000 | 238.42 | 280.0 | 371.30 | 132.88 |
| 6 | *41,000 | 178.74 | 270.0 | 301.91 | 123.18 |
| 7 | GROUND | AMBIENT | 0.0 | AMBIENT | 0.00 |

*= RVSM boundaries

In one of the embodiments, the signal processor 150 can issue signals to the pressure source 100 and the manifold system 140 to simulate aircraft altitude and airspeed values to both sides of an aircraft, i.e. the pilot and co-pilot sides, undergoing an air data test. That is, the signal processor 150 issues commanded air pressure values to the instrumentation on both the pilot and the co-pilot sides of the aircraft under test.

In other embodiments, the manifold system 140 and signal processor 150 can be configured to produce a highly precise pressure output. As mentioned in the Background, even small deviations in pressure level can result in relatively large errors in the aircraft altitude and/or airspeed values. In some embodiments, highly precise pressure regulators and pressure sensing equipment may be used to achieve the desired pitot-static test results. To effect these results, the signal processor 150 is configured to: (i) issue commanded air pressure signals to each of the static and pitot ports 120a, 120b, 130a, 130b, (ii) monitor the air pressure in the manifold system 140 (equivalent to the air pressure delivered to the aircraft) to detect variations beyond a predetermined range of air pressure values, and (iii) issue an air pressure correction signal to maintain the commanded air pressure while conducting the air data test. As such, pressure may be maintained in the manifold system 140 irrespective of leaks which may continuously allow a steady loss of pressure in the manifold system. That is, pressure may be pumped into the manifold system 140 at the same rate that it is lost due to leaks.

Figure 2:
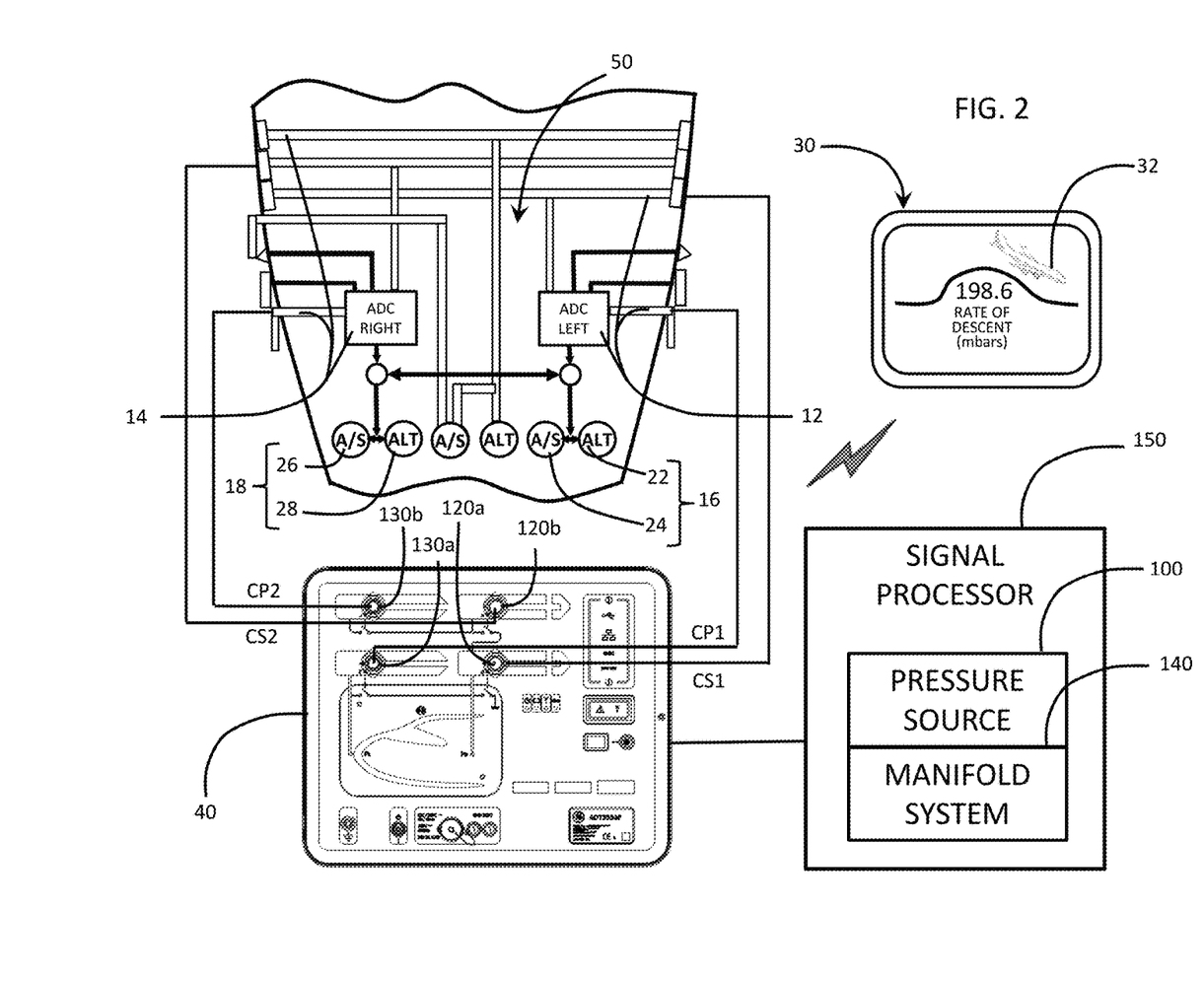
FIG. 2 is a broken-away, schematic, plan view of the Air Data Test System (ADTS) including a detailed schematic of the aircraft pilot and co-pilot pitot-static air data system and the internal pneumatic plumbing for the airspeed and altitude instrumentation within the aircraft cockpit.
Figure 3:
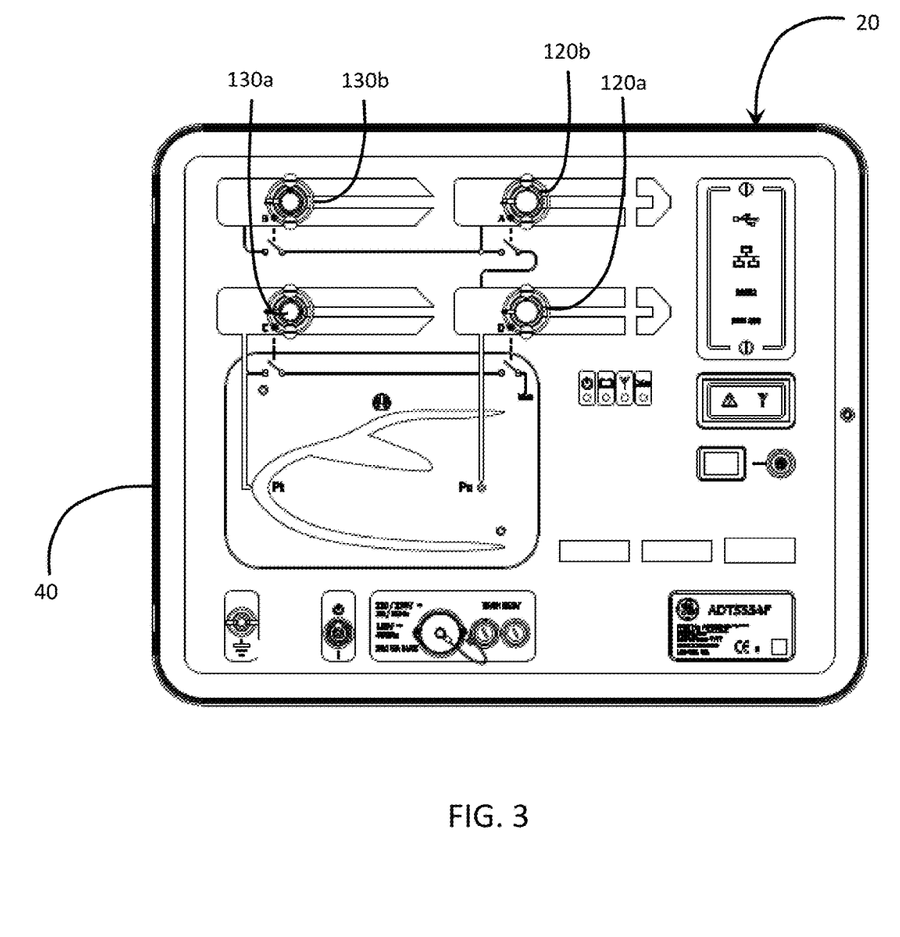
FIG. 3 is an isolated plan view of the Air Data Test Set shown in FIG. 1.

In embodiments illustrated in FIGS. 2 and 3, the housing 40 of the ADTS 10 may envelope: (i) the pressure source, or pneumatic air pumps 100, (ii) the manifold system 140 for directing the flow of pressurized air from the pneumatic pumps 100 to each of the pilot and co-pilot pitot-static systems via channels CS1, CS2, CP1, CP2, and (iii) the signal processor 150 for controlling the pressures delivered by the pneumatic air pumps 100 and the routing nuances of the manifold system 140 to precisely control the highly sensitive pressures sensed by the pilot and co-pilot cockpit instrumentation 16, 18. In the described embodiment, flexible tubing 34 (FIG. 1) connects the static and pitot ports 120a, 120b, 130a, 130b of the ADTS 20 to the corresponding ports associated with the pilot and co-pilot pitot-static systems 12, 14. As an example, the pilot pitot-static system 12 may be on left side of the aircraft 50 (looking out from the cockpit) while the co-pilot pitot-static system 14 may be on the right side of the aircraft 50. Similarly, the pilot altimeter 22 and airspeed indicator 24 may be on the left side of the cockpit dash while the co-pilot altimeter 26 and airspeed indicator 28 may be both on the right side.

Figure 4:
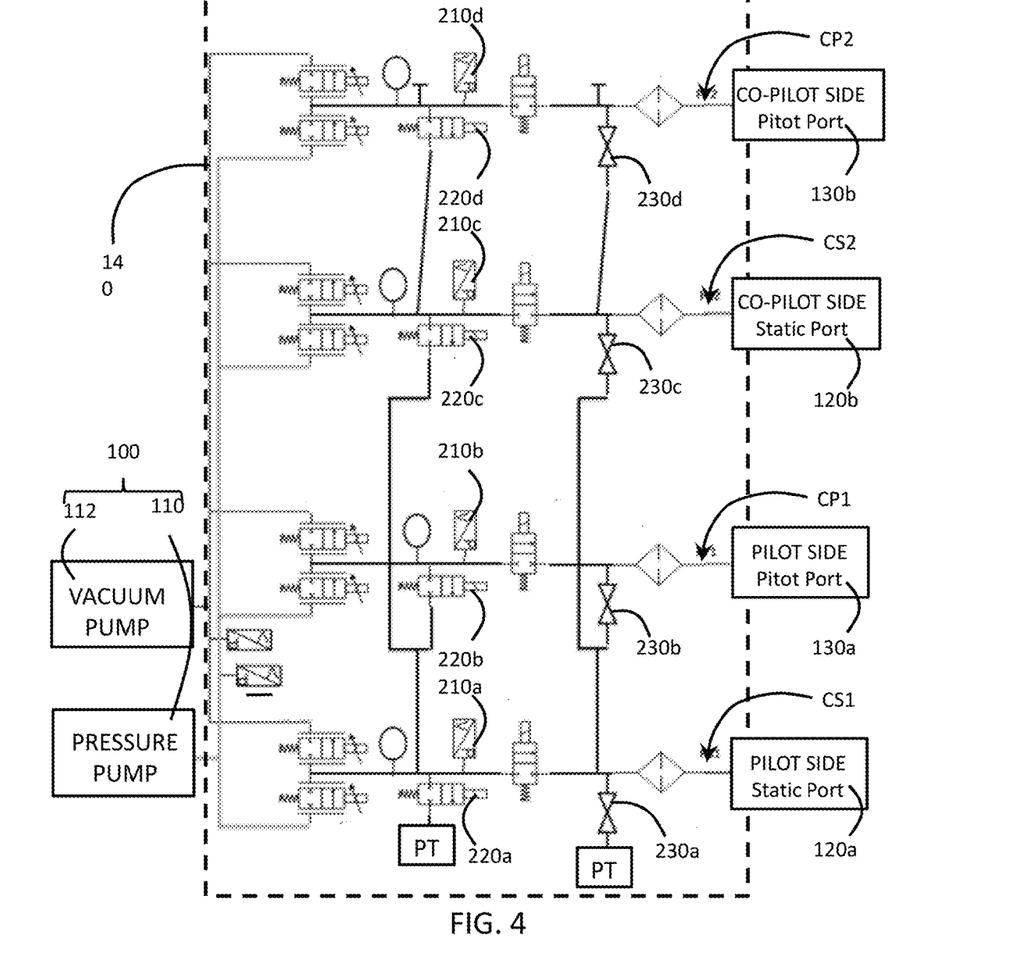
FIG. 4 is a detailed schematic of the manifold system for the Air Data Test System (ADTS) according to the present invention including a plurality of precision pressure valves, precision sensors, zeroing valves and drop-out valves.
Figure 5:
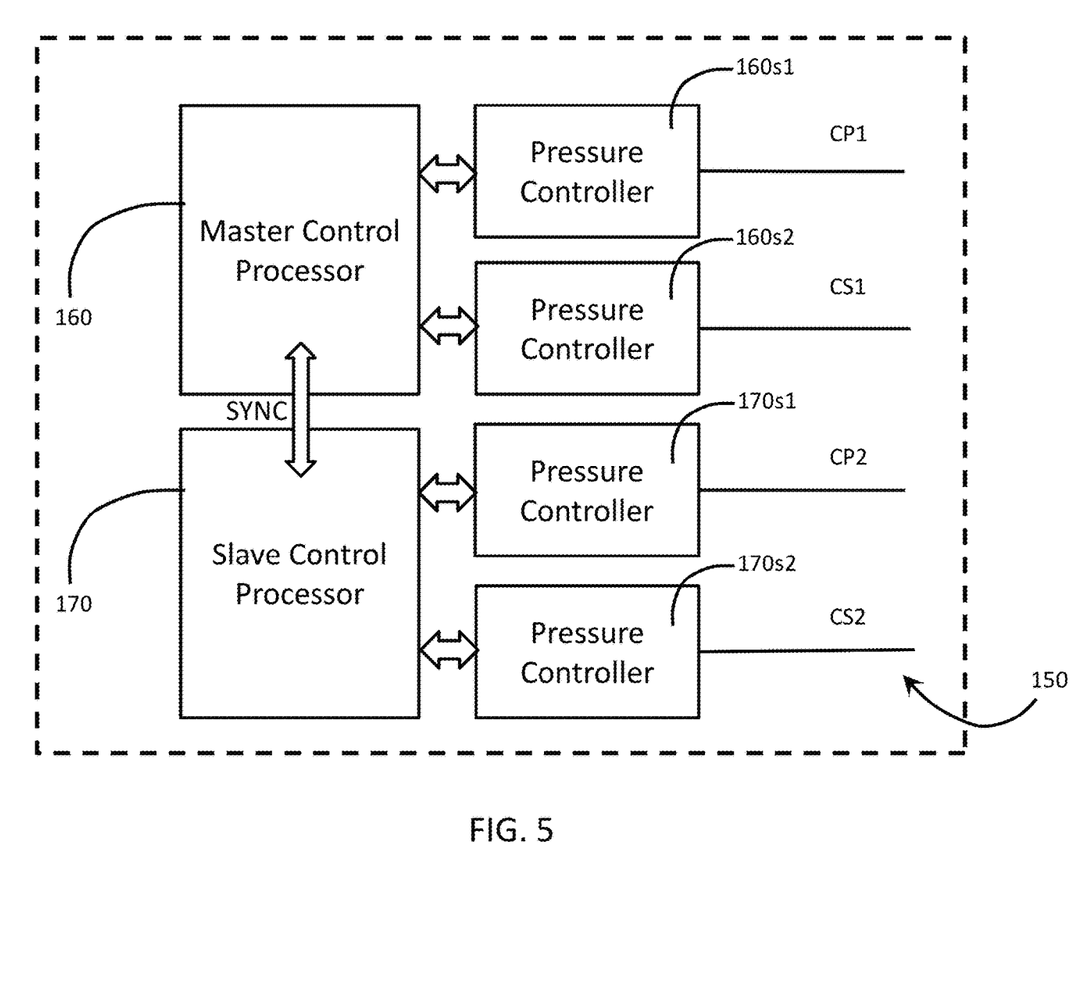
FIG. 5 depicts a schematic view of the control architecture of the signal processor for the Air Data Test System (ADTS) according to the present invention.

As illustrated in FIGS. 4 and 5, precision pumps 100, pressure sensors 210a-210d, and zeroing and drop-out valves 220a-220d, 230a-230d may be employed to maintain precision control of the commanded pressure values sent and the actual pressure values achieved in the lines between the air data test set 20 and the aircraft instrumentation 16, 18, i.e., in the altimeters 22, 26 and airspeed indicators 24, 28. In the described embodiment, the upstream pneumatic pressure source 100 is provided by a pressure pump 110 and a vacuum pump 112. It will be appreciated, however, that a single pneumatic pump may be employed by, for example, using the output side thereof for providing positive pressure and the input side for providing negative pressure (i.e., vacuum pressure.)

The manifold system 140 may comprise four channels CS1, CS2, CP1, CP2 of air flow. The manifold system can connect the pressure source 100 to each of the static and pitot ports 120a, 120b, 130a, 130b associated with the pilot and co-pilot pitot-static systems 12, 14 of the aircraft 50 undergoing test. While the pressure values may be controlled by the pressure and/or vacuum pumps 110, 112, the manifold system 140 controls and vents the pressures generated by the pumps 110, 112, to develop the pressure in each of the static and pitot ports 120a, 120b, 130a, 130b. In one embodiment, a plurality of zeroing values 220a, 220b, 220c, 220d interpose the pneumatic plumbing associated with each of the channels CS1, CS2, CP1, CP2 of the manifold system 140. The zeroing valves 220a, 220b, 220c, 220d are essentially interconnected, i.e., across the channels CS1, CS2, CP1, CP2 and vented to a predefined threshold pressure PT prior to commencing a test cycle. In the described embodiment, the zeroing valves 220a, 220b, 220c, 220d can be vented to atmospheric pressure (14.7 psig or 1013 millibars), however, the valves may be vented to another pressure value.

By connecting all of the zeroing valves 220a, 220b, 220c, 220d to a common pressure, i.e., atmospheric pressure, system may "zero-out" any offset which may be present between the pressures sensors 210a, 210b, 210c, 210d or account for any drift between the sensors over time. In other embodiments, it may be desirable to vent the zeroing values 220a, 220b, 220c, 220d to another ambient pressure, e.g., simulate a pressure of 50,000 ft or 115 millibars, to account for drift of the sensors 210a, 210b, 210c, 210d at a higher altitude where pressure variations are even more difficult to ascertain, which can further improve precision. The zeroing valves 220a, 220b, 220c, 220d allows highly accurate pressure differentials to be applied to the pilot and co-pilot systems, as required.

In yet another embodiment, and referring to FIG. 5, the signal processor 150 can employ at least one master control processor 160 associated with each of the static and pitot ports 120a, 120b, 130a, 130b across channels CP1, CS1, and at least one slave control processor 170 associated with the static and dynamic ports across channels CP2, CS2. In this embodiment, the master control processor 160 is synchronized with the slave control processor 170 such that the commanded air pressure associated with the master and slave control processors 160, 170 are coordinated and can operate in unison. As a consequence, the air pressures associated with each of the master and slave control processors 160, 170, may rise, fall, start, stop, accelerate and decelerate together. More specifically, the synchronization function controls when measurements are taken from the precision pressure sensors 210a, 210b, 210c, 210d. Any offset in the time between measurements can result in an error signals which cause the pressure signals applied to the aircraft to drift. It is for this reason that all of the sensors may be synchronized i.e., interrogated at the same time. In some embodiments, the sensors must be synchronized.

The master and slave control processors 160, 170 can each produce a control signal 160s1, 160s2, 170s1, 170s2, which can be continuously compared to determine an error signal therebetween. The difference therebetween, or the error signal, can be added back to the control signals of either the master or slave control processors 160, 170 until the data matches, e.g., the control pressures. That is, depending upon a predetermined allowable between the signals, the static and dynamic master control signals across channels CS1, CP1 will be increased or decreased depending on the static and dynamic slave control signals and synchronized with the master control signals.

In the described embodiment, the master and slave control processors 160, 170 use a Controller Area Network (CAN) bus protocol. The CAN bus can be a broadcast-type bus which indicates that all nodes of the processors 160, 170, "hear" all transmissions. As a consequence, signals 160s1, 160s2, 170s1, 170s2 are picked up by all nodes of the processors 160, 170 to synchronize the control signals 160s1, 160s2, 170s1, 170s2.

In yet another embodiment, each of the control channels CS1, CS2, CP1, CP2 can include "let-down" or "drop-off" valve 230a, 230b, 230c, 230d, immediately upstream of the static and pitot ports 120a, 120b, 130a, 130b, of the manifold system 140. Furthermore, the drop-off valves 230a, 230b, 230c, 230d may be disposed downstream of the zeroing values 220a, 220b, 220c, 220d and the pressures sensors 210a, 210b, 210c, 210d of the manifold system 140. The drop-off valves 230a, 230b, 230c, 230d may be sequentially opened for instance, when power is removed to the ADTS, i.e., manually or automatically, to prevent large, sudden pressure drops in the manifold system 140 which may inadvertently damage the altitude and airspeed instruments in each of the pilot and co-pilot pitot-static systems 12, 14. That is, the drop-off valves 230a, 230b, 230c, 230d are functionally operative to maintain a threshold pressure differential within each of the altitude and airspeed cockpit instruments and a "safe at ground" pressure.

In summary, the ADTS system 10 of the disclosure can enable simultaneous testing of both the pilot and co-pilot sides of the pitot-static systems 12, 14. That is, the use of four (4) channels, two (2) for the static ports 120a, 120b and two (2) for the pitot ports 130a, 130b can allow simultaneous pressurization of both pilot and co-pilot pitot-static systems 12, 14. Furthermore, pressurization of both the pilot and co-pilot systems 12, 14 may eliminate leakage commonly attributed to two (2) channel systems, which use a line-switching unit to separately and independently pressurize the pilot and co-pilot systems 12, 14. The four (4) channel system of the present disclosure provides a manifold system which delivers a constant pressure feed, thereby preventing the potential for one side to depressurize due to leaks in the line-switching unit or aircraft.

In addition to leaks in the system and loss of pressure, the ADTS 10 of the present disclosure can "zero-out" any offset which may be present between the pressure sensors 210a, 210b, 210c, 210d while also accounting for any drift therebetween over time. The Master-Slave control architecture and CAN protocol, furthermore, can prevent loss of synchronization between pressure sensors and improves system accuracy. Finally, the use of drop-off or "let-down" valves may prevent damage to the ADTS in the event of a sudden pressure loss within the system.

Pitot-Static Air Data Test System with Automatic Dependent Surveillance-Broadcast (ADS-B) System (integrated ADTS/ADS-B System)

In another embodiment, the critical instrumentation features of the previously-described Air Data Test System (ADTS) can be combined/integrated with an Automated Dependent Surveillance-Broadcast (ADS-B) system which broadcasts certain instrumentation data, i.e., latitude, longitude, altitude and airspeed, via an aircraft transponder. More specifically, the integrated ADTS/ADS-B system may be capable of one or more of: (i) simulating aircraft instrumentation data (produced by the ADTS hardware and software described hereinbefore), (ii) capturing/recording the simulated instrumentation data via a radio link capable of "listening" for the broadcast instrumentation data transmitted by the transponder, and (iii) comparing the simulated instrumentation values to the prescribed instrumentation values i.e., obtained in step (i), when determining the pressure sets corresponding to the prescribed altitude and airspeed values) to validate the operation of the integrated systems, i.e., the ADTS/ADS-B systems. As such, the integrated ADTS/ADS-B system may allow the pneumatically-generated instrumentation values to be simulated and "reported-out" such that one can simultaneously test and determine the functionality of the aircraft ADS-B system.

Figure 6:
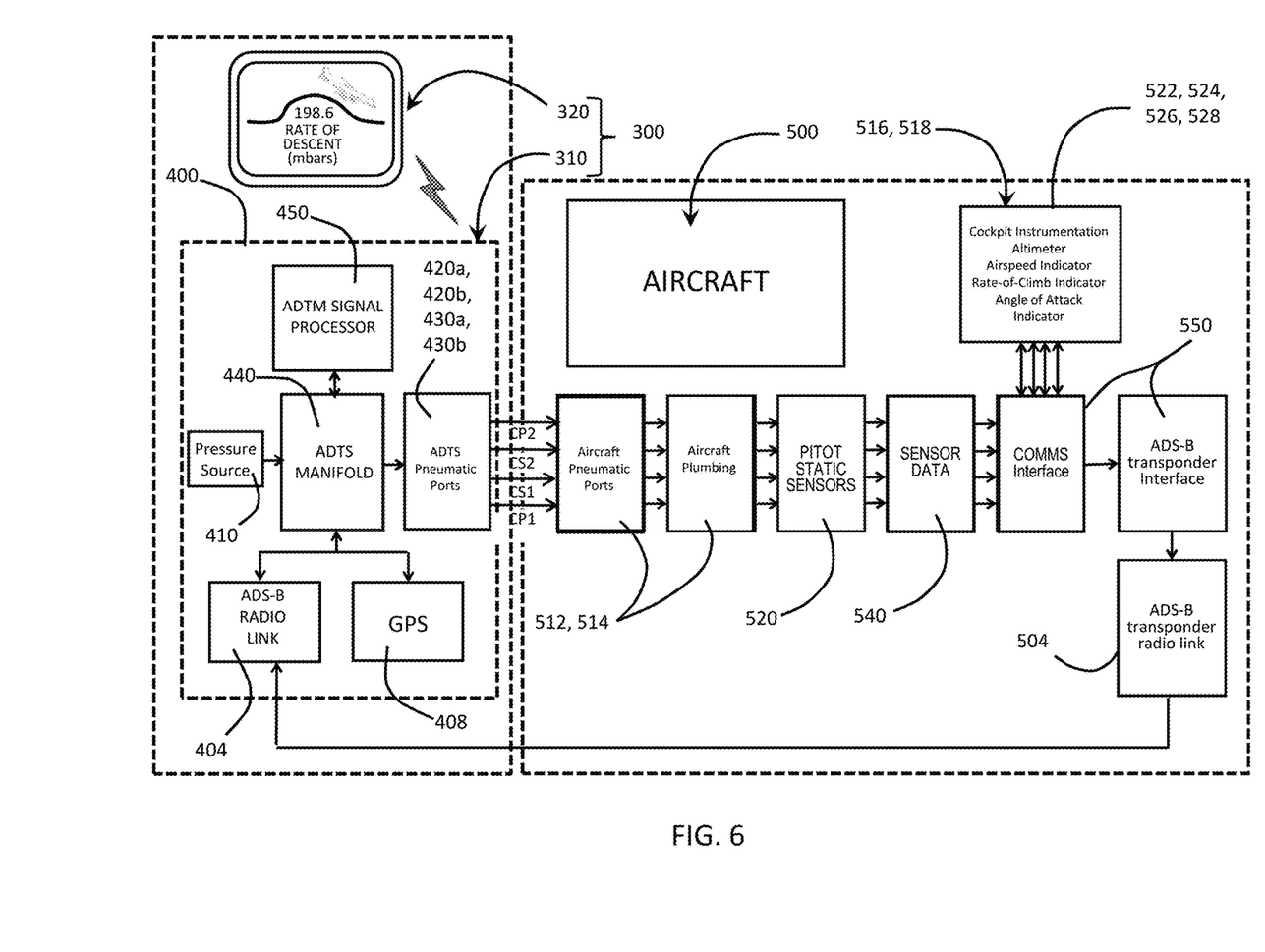
FIG. 6 is a schematic view of a Pitot Static Air Data Tester with Automatic Dependent Surveillance-Broadcast (ADS-B) system which synergistically combines features of an Air Data Test System (ADTS) with those of an Automated Dependent Surveillance-Broadcast (ADS-B) system to facilitate testing of each system independently or collectively while allowing test results to be cross-checked for errors and accuracy.
Figure 7A:
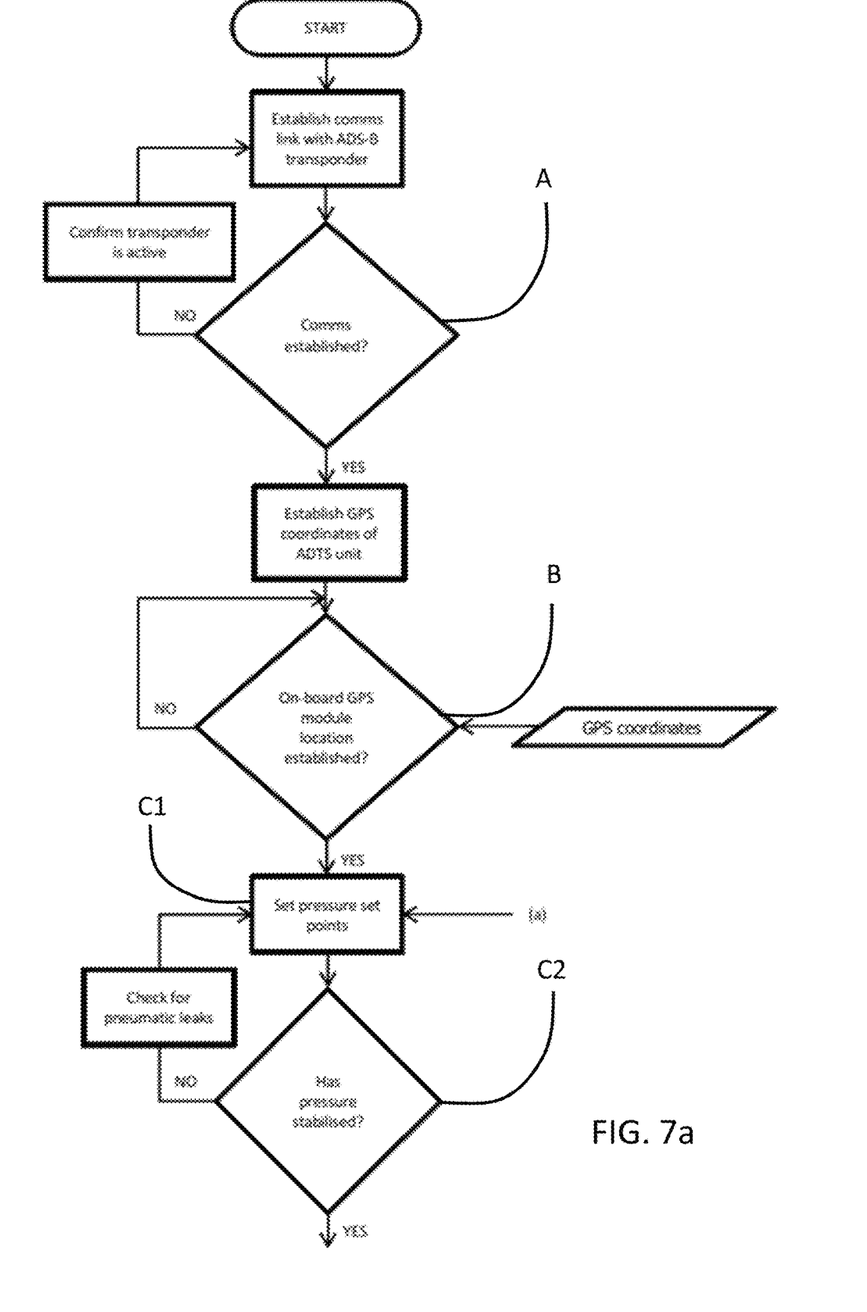
FIGS. 7a and 7b is a flow-diagram of the test procedure in connection with the Air Data Test System (ADTS) and an Automated Dependent Surveillance-Broadcast (ADS-B) System shown in FIG. 6.
Figure 7B:
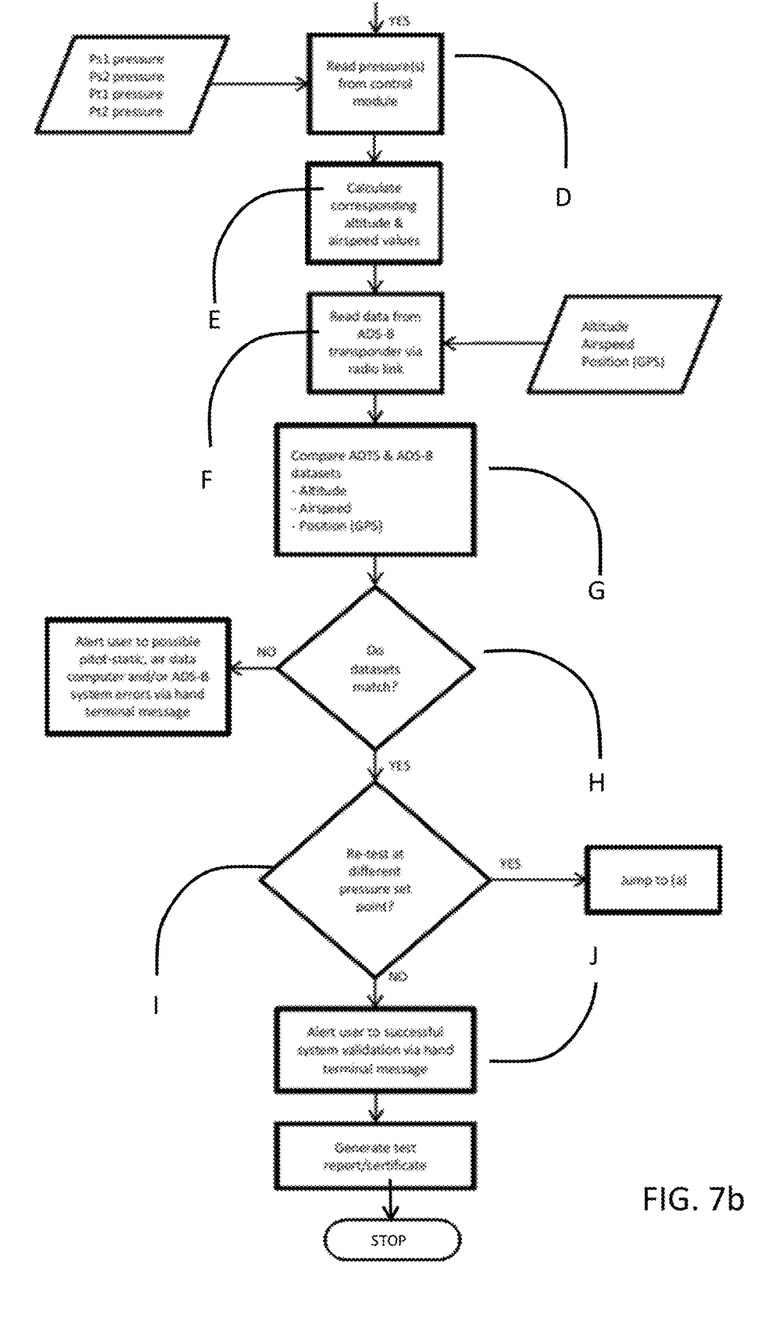

In FIGS. 6, 7a and 7b, schematic and flow diagrams depict the architecture and operation of the integrated ADTS/ADS-B system 300. More specifically, and referring to a FIG. 6, the integrated ADTS/ADS-B system 300 can comprise an Air Data Test Module (ADTM) 310 employing a mobile device 320 to wirelessly input operator commands to the ADTM 310. The housing 400 of the ADT-B encloses, encases or integrates one or more of: (i) at least one pressure source 410, (ii) first and second static ports 420a, 420b in fluid communication with the pressure source 410, (iii) first and second impact ports 430a, 430b (hereinafter "pitot" ports) also in fluid communication with the pressure source 410, (iv) a manifold system 440 interposing, and pneumatically coupled to, the pressure source 410 and each of the static and pitot ports 420a, 420b, 430a, 430b, and (v) a signal processor 450 operatively coupled to, and controlling the operation of the pressure source 410 and the manifold system 440. The first and second static ports 420a, 420b correspond to first and second channels CS1, CP1, respectively, while the first and second impact ports 430a, 130b correspond to third and fourth channels, CS2 and CP2, respectively.

In step A of the test procedure, a communication link can be established between an aircraft 500 undergoing test and the integrated ADTS/ADS-B system 300. More specifically, the ADTS and ADS-B system 300 can be equipped with a radio link 404 operative to receive RF transmissions within a predefined space although a wired connection may also be possible for test purposes. Similar to the prior embodiment, the aircraft 500 can include a first (i.e. a pilot) and a second (i.e. co-pilot) pitot static system 512, 514 which include static and impact sensors 520 operative to send pressure signals 540 (i.e., via flexible tubing) to a pilot and co-pilot aircraft instrument 516, 518. The aircraft 500 may also be equipped with a transponder, RF transmitter, or radio link 504 which may be electrically coupled to a suite of pilot and co-pilot instruments 516, 518 on-board the aircraft 500. The instruments 516, 518 may include a pilot altimeter 522, pilot airspeed indicator 524, co-pilot altimeter 526, and co-pilot airspeed indicator 528. Other instruments such as a rate-of-climb indicator and an angle of attack indicator may also be included.

In a step B, a GPS module 408 can establish communication with GPS satellites to determine the current coordinates of the ADTS/ADS-B 300. Aircraft 500 may be equipped with an on-board GPS system 504 that can broadcast, via its transponder 504, any one of a variety of instrumentation values to the radio link or receiver 404 of the integrated ADTS/ADS-B 300 system.

Before discussing the steps C-J in detail, it may be useful to broadly describe the general approach associated with verifying method steps including the steps of: (i) calculating one or more pressure set points indicative of prescribed instrumentation values, (ii) effecting pressurization of at least one of the aircraft pitot-static systems by the Air Data Test Module (ADTM) 310 of the integrated ADTS/ADS-B system 300 (i.e., to effect simulated instrumentation values via the cockpit instrumentation of the aircraft 500), (iii) receiving the simulated instrumentation values, and (iv) comparing calculated/prescribed instrumentation values to simulated instrumentation values. Stated another way, the calculated/prescribed instrumentation values may be compared to the actual/simulated instrumentation values to determine whether an error of sufficient magnitude exists, i.e., sufficient to warrant error correction of the pitot-static system, air data computer and/or ADS-B transponder.

Continuing with the detailed discussion of the method, step C1 determines the set points indicative of a prescribed instrumentation value while step C2 pneumatically pressurizes the various channels CS1, CS2, CP1, CP2 until the set points have stabilized. In step D, the pressures applied through each of the channels can be read such that that the corresponding altitude and airspeed values may be evaluated/calculated in step E. That is, the instrumentation data from the aircraft transponder 504 can be automatically read to correlate the results internally while displaying a result to the user. In steps F and G the instrumentation values can be broadcast by the aircraft transponder 504. That is, the actual or prescribed instrumentation values can be read in step F and compared with the calculated values obtained in Step E.

If the datasets match in step H, then the test may continue, testing another group of pressure set points in step I. If the datasets do not match in step H, then an alert may be issued concerning errors in the ADT-B System 300 in step J. The entire process may be automated so that when the user presses "START" the test runs until it ends with a "SUCCESS/FAILURE" message displayed the graphical user interface screen.

In summary, the integrated ADTS/ADS-B system 300 of the present disclosure can verify the functionality of the aircraft ADS-Broadcast system/transponder. These results can be verified for accuracy when prior art ADS-B test results can produce erroneous or misleading results. That is, when tested, an aircraft ADS-B system may produce a result that the aircraft is operating at zero (0) knots and at zero (0) feet in altitude when the aircraft is at rest in a hangar environment. By integrating an ADTS with the aircraft ADS-B system, an aircraft transponder can be tested to see whether the simulated pressure values, i.e., associated with the altitude and airspeed values, are transmitted by the transponder. This not only can test the functionality of the transponder, but can also test whether the transponder values correlate to the simulated pressure values.

As will be appreciated by one skilled in the art, aspects of the present invention may be embodied as a system, method, or computer program product. Accordingly, aspects of the present invention may take the form of a hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

To the extent that the claims recite the phrase "at least one of" in reference to a plurality of elements, this is intended to mean at least one or more of the listed elements, and is not limited to at least one of each element. For example, "at least one of an element A, element B, and element C," is intended to indicate element A alone, or element B alone, or element C alone, or any combination thereof. "At least one of element A, element B, and element C" is not intended to be limited to at least one of an element A, at least one of an element B, and at least one of an element C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for verifying an instrumentation value issued by a transponder, the system comprising:
    an Air Data Test Module (ADTM) configured to pneumatically simulate at least one instrumentation value based upon an applied pressure set-point, the pneumatically simulated instrumentation value corresponding to the applied pressure set point, the ADTM including a manifold including a plurality of channels, the plurality of channels including a first channel configured to pressurize a static port of an aircraft, a second channel configured to pressurize a pitot port of the aircraft, the pressurization of the static port and the pitot port occurring simultaneously;
    a receiver module configured to receive the at least one pneumatically simulated instrumentation value transmitted the transponder, and
    a signal processor operative to control the ADTM, command a prescribed instrumentation value to be simulated by the ADTM, compare the prescribed instrumentation value to the received instrumentation value, and issue a pass signal if the values match and a fail signal if the values do not match.

2. The system according to claim 1, further comprising:
    a graphical user interface operative to input the pressure set-points of the ADTM to generate the pneumatically-simulated instrumentation value, and to display the pass and fail signals of the signal processor.

3. The system according to claim 1,
    wherein the at least one pneumatically-simulated instrumentation value includes an altitude value simulated on an altimeter and an airspeed value simulated by an airspeed indicator.

4. The system according to claim 1,
    wherein the instrumentation includes both a first and a second instrumentation.

5. The system according to claim 1,
    wherein the signal processor is configured to independently and collectively issue commanded air pressure signals indicative of airspeed and altitude values to each of the first and second pitot-static systems.

6. The system according to claim 1,
    wherein the signal processor issues calibrated pressure offsets between first and second pitot-static systems to independently test the alarm systems thereof.

7. The system according to claim 1,
    wherein the signal processor further comprises a master controller operative to control one of the pairs of impact and static ADTS ports and a slave controller operative to control the other of the pairs of impact and static ADTS ports and wherein the slave controller is synchronized with the master controller such that the commanded air pressure signals are simultaneously received by the first and second pitot-static systems.

8. The system according to claim 1 further comprising:
    a graphical user interface operative to input the pressure set-points of the ADTM to generate the pneumatically-simulated instrumentation value and to output the pass and fail signals of the signal processor.

9. The system according to claim 8,
    wherein the at least one instrumentation value includes an altitude value simulated on an aircraft altimeter and an airspeed value simulated by an airspeed indicator.

10. The system according to claim 8,
    wherein the instrumentation includes both the first and second instrumentation.

11. The system according to claim 8,
    wherein the signal processor is configured to independently and collectively issue commanded air pressure signals indicative of airspeed and altitude values to each of the first and second pitot-static systems.

12. The system according to claim 8,
    wherein the signal processor issues calibrated pressure offsets between first and second pitot-static systems to independently test the alarm systems thereof.

13. The system according to claim 1, wherein the pneumatically simulated instrumentation value is reported to a control computer for transmission by the transponder.

14. The system according to claim 1, wherein the plurality of channels further includes a third channel configured to pressurize a second static port of the aircraft, the pressurization of the second static port occurring simultaneously with the pressurization of the static port and the pitot port.

15. A method for testing an Automatic Dependent Surveillance-Broadcast (ADS-B) system comprising the steps of:
    calculating a pressure set point indicative of a prescribed instrumentation value;
    pneumatically simultaneously pressurizing plurality of pitot-static systems by an Air Data Test Module (ADTM) to simulate at least one instrumentation value via the instrumentation undergoing an air data test;
    receiving the simulated instrumentation value and comparing the same to the prescribed instrumentation value;
    determining whether the simulated and prescribed instrumentation values are equal; and
    providing a visual cue regarding the status of the instrumentation values to validate the operation of the pitot-static and the ADS-B systems.

16. The method according to claim 15 further comprising the steps of:

determining the GPS coordinates of the ADTM to determine the current altitude thereof;
reading the altitude value of an altimeter transmitted by a transponder;
comparing the altitude values of the ADTM GPS and the altimeter to validate the operation of the ADS-B system.

17. The method according to claim 15,
wherein the simulated instrumentation values are indicative of airspeed and altitude, and further comprising the step of:
issuing the simulated instrumentation values to each of a first and a second pitot-static systems through the ADTM.

18. The method according to claim 15 further comprising the step of:
issuing calibrated pressure offsets between first and second pitot-static systems to independently test the alarm systems thereof.

19. The method according to claim 15 further comprising the step of:
displaying the visual cue on a graphical user interface.

20. The method according to claim 15,
wherein input commands to the ADTM are made by a mobile input device.

21. The method according to claim 15,
wherein input commands to the ADTM are made by a monitor connected to the ADTM.

22. A system, comprising:
an Air Data Test Module (ADTM) including at least one pressure source, a manifold system pneumatically coupled to the at least one pressure source, and a signal processor operatively coupled to the at least one pressure source and the manifold system to pneumatically simulate at least one instrumentation value undergoing an air data test, the ADTM including a manifold including a plurality of channels, the plurality of channels including a first channel configured to pressurize a static port of an aircraft, a second channel configured to pressurize a pitot port of the aircraft, the pressurization of the static port and the pitot port occurring simultaneously;
a receiver module including a link operative to receive the at least one pneumatically-simulated instrumentation value transmitted by an transponder,
a global positioning system (GPS) module including a GPS receiver operative to receive the GPS coordinates of the ADTM and the at least one instrument undergoing the air data test; and
a signal processor controlling the ADTM, command a prescribed instrumentation value to be simulated by the ADTM, compare the prescribed instrumentation value to the received instrumentation value, issue a pass signal when the values match, and a fail signal when the values do not match.

23. The system according to claim 22, wherein the pneumatically simulated instrumentation value corresponds to a pressure set point issued by the ADTM.

24. The system according to claim 22, wherein the pneumatically simulated instrumentation value is reported to a control computer for transmission by the transponder.

25. The system according to claim 22, wherein the plurality of channels further includes a third channel configured to pressurize a second static port of the aircraft, the pressurization of the second static port occurring simultaneously with the pressurization of the static port and the pitot port.

26. The system according to claim 14, wherein the plurality of channels further includes a fourth channel configured to pressurize a second pitot port of the aircraft, the pressurization of the second pitot port occurring simultaneously with the pressurization of the static port, the pitot port, and the second static port.

27. The system according to claim 15, wherein the plurality of channels further includes a fourth channel configured to pressurize a second pitot port of the aircraft, the pressurization of the second pitot port occurring simultaneously with the pressurization of the static port, the pitot port, and the second static port.

* * * * *